US008064955B2

(12) United States Patent
Rofougaran

(10) Patent No.: US 8,064,955 B2
(45) Date of Patent: *Nov. 22, 2011

(54) COMMUNICATION DEVICES WITH INTEGRATED GYRATORS AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,336

(22) Filed: Apr. 20, 2011

(65) Prior Publication Data

US 2011/0195671 A1 Aug. 11, 2011

Related U.S. Application Data

(63) Continuation of application No. 12/624,303, filed on Nov. 23, 2009, now Pat. No. 7,957,767, which is a continuation of application No. 11/731,257, filed on Mar. 29, 2007, now Pat. No. 7,647,071.

(51) Int. Cl.
*H04M 1/00* (2006.01)
(52) U.S. Cl. .............. 455/556.1; 455/456.1; 455/456.3; 455/456.6; 455/25; 455/522; 455/68; 455/69; 455/556.2; 455/121; 455/123; 455/127.1; 455/101; 342/354; 342/357.1; 342/357.06; 342/357.12; 342/357.14; 701/213; 701/220; 340/539.1; 340/539.13
(58) Field of Classification Search .... 455/456.1–456.6, 455/68–69, 556.1–556.2, 557, 522, 121, 455/123, 25, 127.1, 101; 340/539.1, 539.11–539.19; 342/357.01, 357.06, 357.12, 357.14, 357.1, 342/354; 701/213–215, 220
See application file for complete search history.

(56) References Cited

U.S. PATENT DOCUMENTS

| | | | |
|---|---|---|---|
| 5,029,872 A | 7/1991 | Sassak | |
| 5,139,261 A | 8/1992 | Openiano | |
| 5,644,317 A * | 7/1997 | Weston et al. | 342/357.31 |
| 5,794,164 A * | 8/1998 | Beckert et al. | 455/3.06 |
| 6,422,941 B1 | 7/2002 | Thorner et al. | |
| 6,438,393 B1 * | 8/2002 | Suuronen | 455/575.1 |
| 6,621,413 B1 * | 9/2003 | Roman et al. | 340/539.12 |
| 6,898,492 B2 * | 5/2005 | de Leon et al. | 701/35 |
| 6,992,580 B2 * | 1/2006 | Kotzin et al. | 340/539.11 |
| 7,209,751 B2 * | 4/2007 | Nishida et al. | 455/456.1 |
| 7,592,909 B2 * | 9/2009 | Zaruba et al. | 340/539.13 |
| 2002/0077189 A1 | 6/2002 | Tuer et al. | |
| 2005/0110778 A1 | 5/2005 | Ayed | |
| 2006/0025229 A1 | 2/2006 | Mahajan et al. | |
| 2006/0094449 A1 * | 5/2006 | Goldberg | 455/456.6 |

(Continued)

*Primary Examiner* — Tuan A Tran
(74) *Attorney, Agent, or Firm* — Garlick Harrison & Markison; Bruce E. Stuckman

(57) ABSTRACT

A device includes an on-chip gyrating circuit that generates a motion parameter based on motion of the device. An RF transceiver generates an outbound RF signal from an outbound symbol stream, transmits the outbound RF signal to a remote station of a wireless network, and generates an inbound symbol stream from an inbound RF signal received from the at least one remote station. A processing module processes the motion parameter to produce motion data, converts outbound data into the outbound symbol stream, converts the inbound symbol stream into inbound data, compares current motion data to past motion data, detects when a difference between the current motion data and the past motion data compares unfavorably to a motion change threshold, and include the motion data in the outbound data when the difference between the current motion data and the past motion data compares unfavorably to the motion change threshold.

15 Claims, 17 Drawing Sheets

U.S. PATENT DOCUMENTS

| | | |
|---|---|---|
| 2006/0154726 A1 | 7/2006 | Weston et al. |
| 2006/0166738 A1 | 7/2006 | Eyestone et al. |
| 2006/0277571 A1 | 12/2006 | Marks et al. |
| 2007/0001898 A1 | 1/2007 | Twitchell, Jr. |
| 2007/0021208 A1 | 1/2007 | Mao et al. |
| 2007/0213126 A1 | 9/2007 | Deutsch et al. |
| 2008/0136775 A1 | 6/2008 | Conant |
| 2008/0160922 A1 | 7/2008 | Sun |
| 2008/0174550 A1 | 7/2008 | Laurila et al. |

* cited by examiner

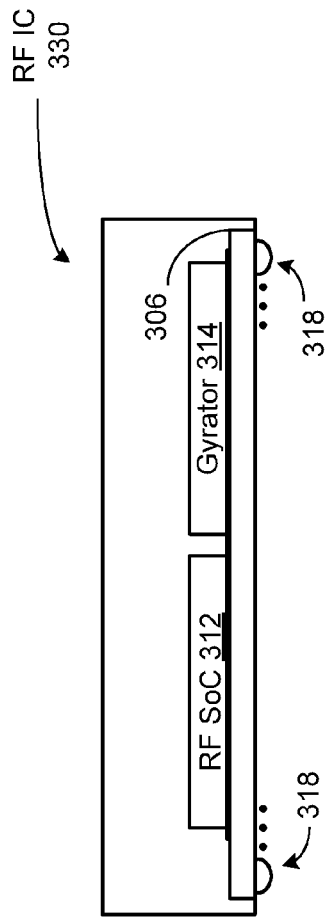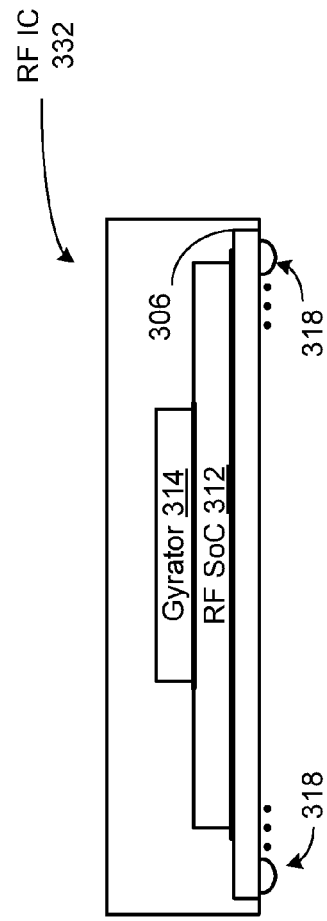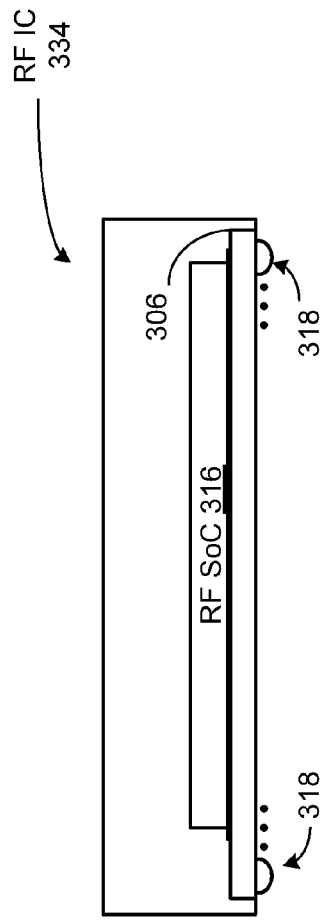

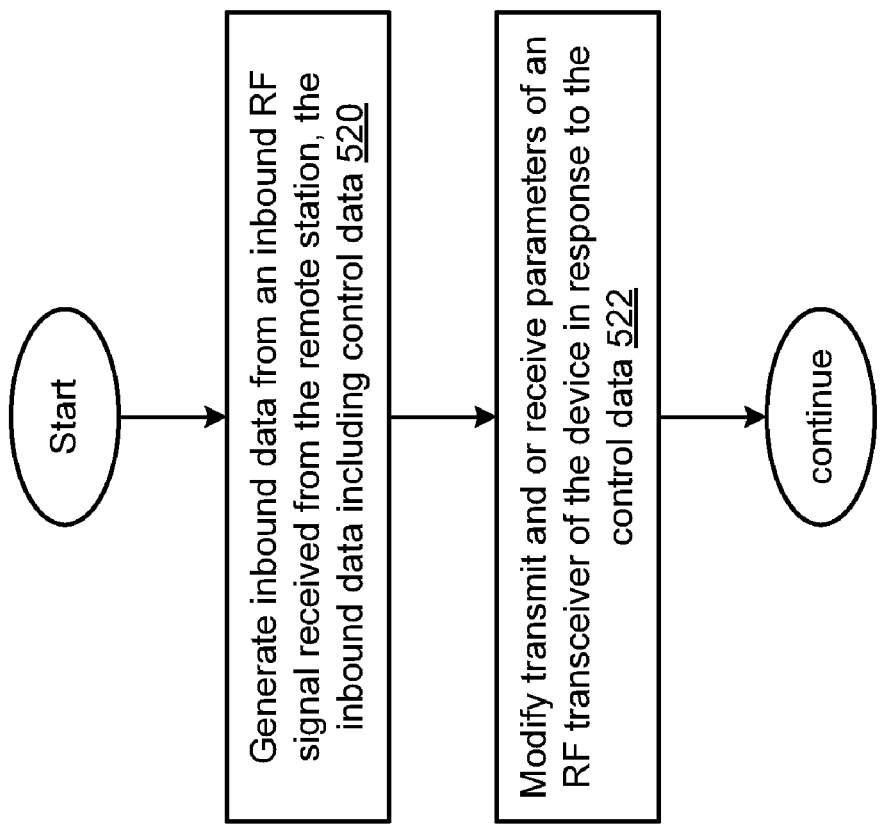

US 8,064,955 B2

COMMUNICATION DEVICES WITH INTEGRATED GYRATORS AND METHODS FOR USE THEREWITH

CROSS-REFERENCE TO RELATED APPLICATIONS

The present application claims priority under 35 U.S.C. 120 as a continuation of U.S. Utility application Ser. No. 12/624,303, entitled, "COMMUNICATION DEVICES WITH INTEGRATED GYRATORS AND METHODS FOR USE THEREWITH,", filed on Nov. 23, 2009, pending, which claims priority pursuant to 35 U.S.C. §120, as a continuation to U.S. Utility application Ser. No. 11/731,257, issued as U.S. Pat. No. 7,647,071, entitled "COMMUNICATION DEVICES WITH INTEGRATED GYRATORS AND METHODS FOR USE THEREWITH,", filed Mar. 29, 2007; All of which are hereby incorporated by reference in their entirety and made part of the present U.S. Utility patent application for all purposes.

BACKGROUND OF THE INVENTION

1. Technical Field of the Invention

This invention relates generally to mobile communication devices and more particularly to a circuit for managing power in a combined voice, data and RF integrated circuit.

2. Description of Related Art

Wireless communication systems are known to support wireless communications between wireless communication devices affiliated with the system. Such wireless communication systems range from national and/or international cellular telephone systems to point-to-point in-home wireless networks. Each type of wireless communication system is constructed, and hence operates, in accordance with one or more standards. Such wireless communication standards include, but are not limited to IEEE 802.11, Bluetooth, advanced mobile phone services (AMPS), digital AMPS, global system for mobile communications (GSM), code division multiple access (CDMA), wireless application protocols (WAP), local multi-point distribution services (LMDS), multi-channel multi-point distribution systems (MMDS), and/or variations thereof.

An IEEE 802.11 compliant wireless communication system includes a plurality of client devices (e.g., laptops, personal computers, personal digital assistants, etc., coupled to a station) that communicate over a wireless link with one or more access points. As is also generally understood in the art, many wireless communications systems employ a carrier-sense multiple access (CSMA) protocol that allows multiple communication devices to share the same radio spectrum. Before a wireless communication device transmits, it "listens" to the wireless link to determine if the spectrum is in use by another station to avoid a potential data collision. The transmitting device (e.g., a client device or access point) transmits at a fixed power level regardless of the distance between the transmitting device and a targeted device (e.g., station or access point). Typically, the closer the transmitting device is to the targeted device, the less error there will be in the reception of the transmitted signal.

When one or more of these communication devices is mobile, its transmit and receive characteristics can change with the motion of the device, as it moves closer or farther from a device it is communication with, and as the transmission environment changes due to the devices position with respect to reflecting members, interfering stations, noise sources, etc.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 3:
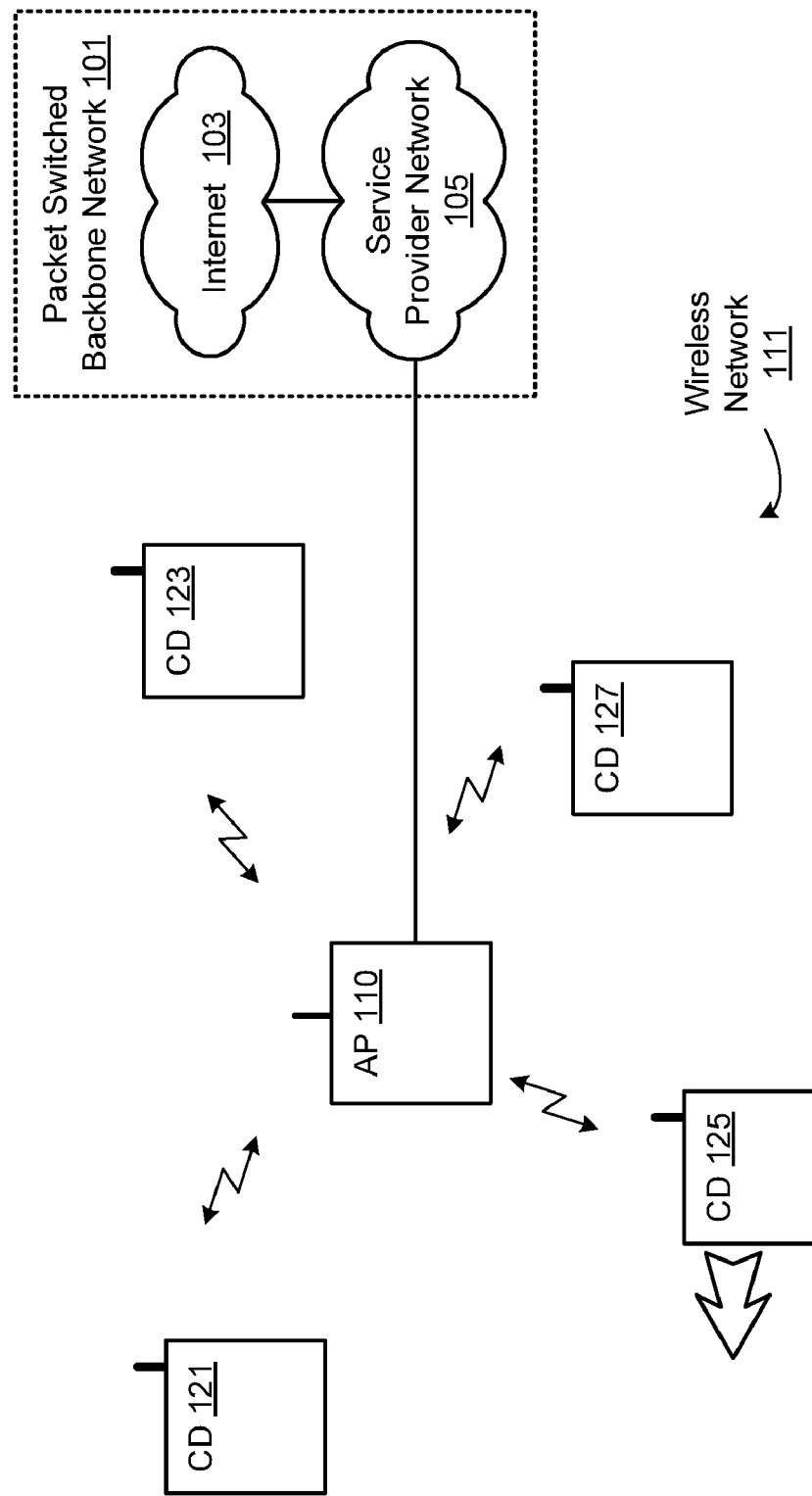

FIG. 3 presents a pictorial representation of a wireless network 111 in accordance with an embodiment of the present invention.

Figure 4:
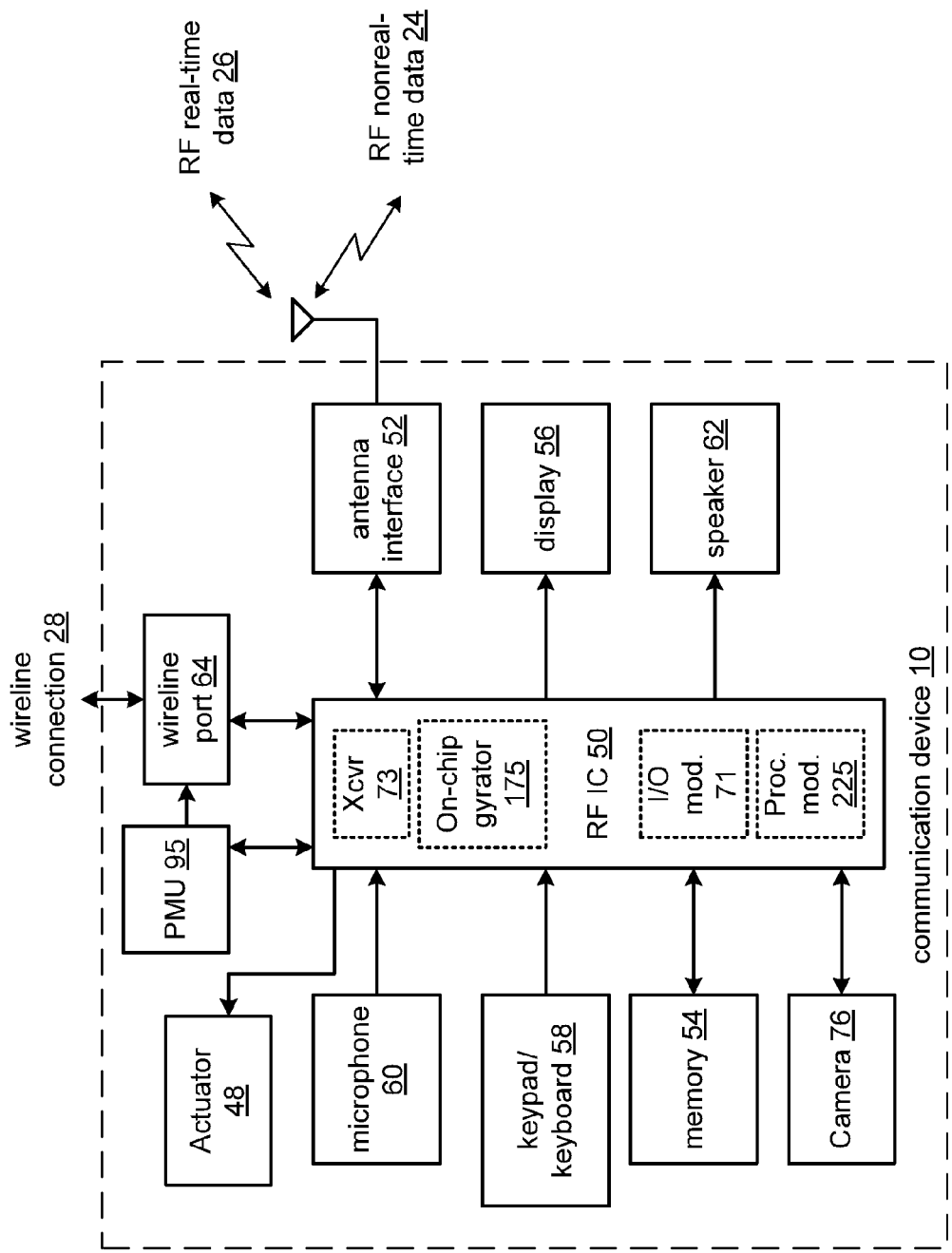
Figure 5:
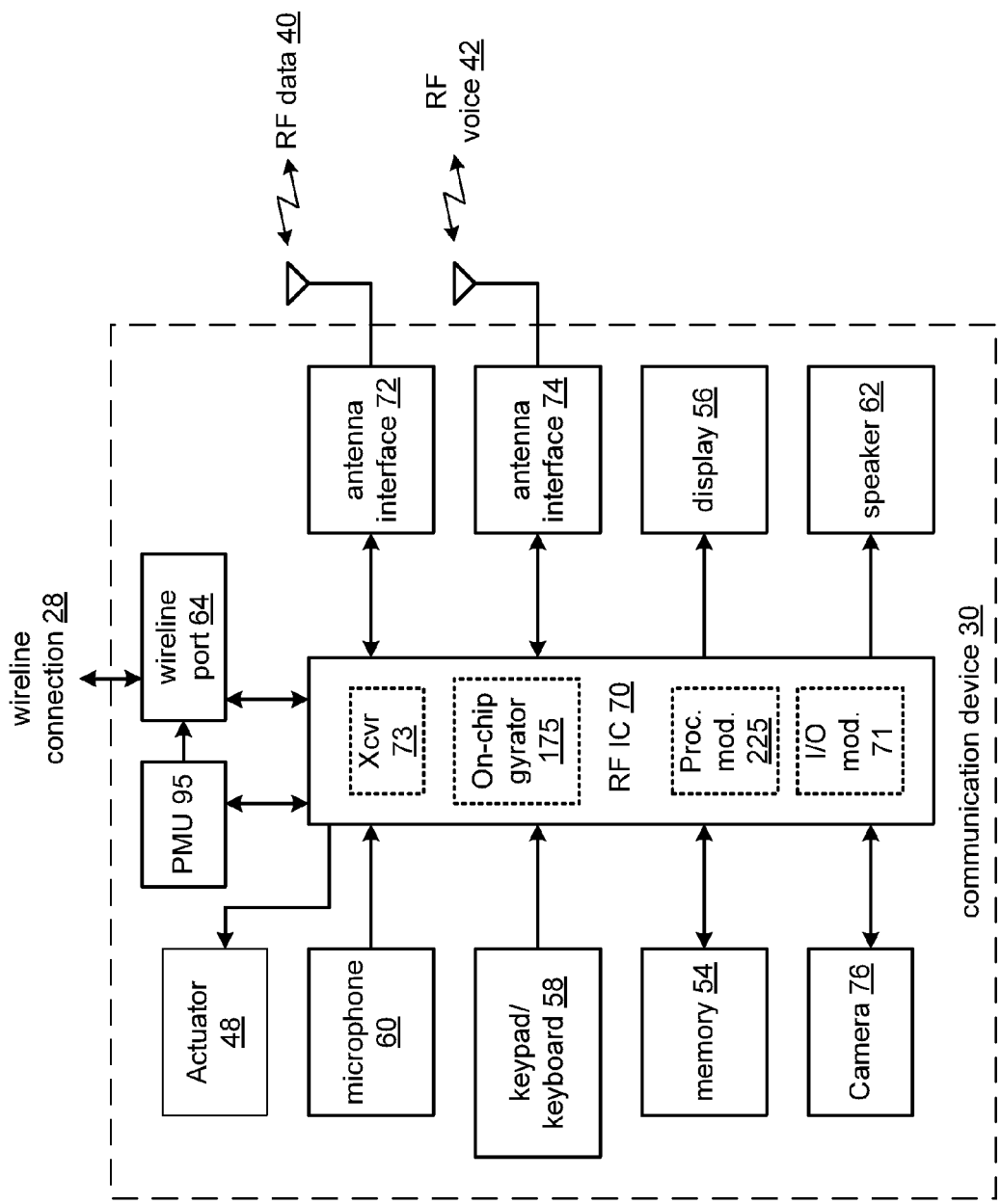
Figure 6:
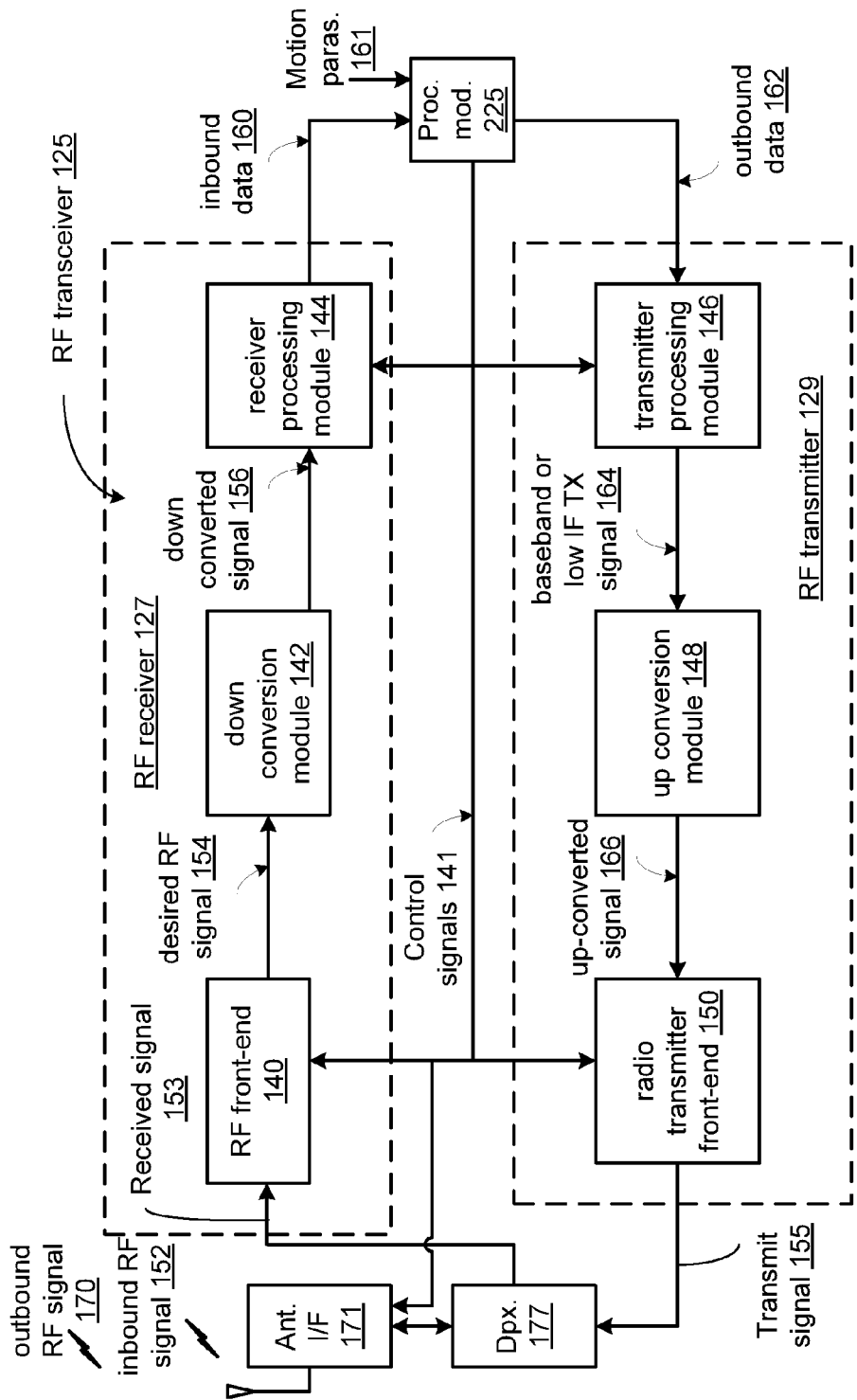

FIG. 4 is a schematic block diagram of an embodiment of an integrated circuit in accordance with the present invention;

FIG. 5 is a schematic block diagram of another embodiment of an integrated circuit in accordance with the present invention;

FIG. 6 is a schematic block diagram of an embodiment of RF transceiver 125 in accordance with the present invention;

FIG. 7 is a side view of a pictorial representation of an integrated circuit package in accordance with an embodiment of the present invention.

FIG. 8 is a side view of a pictorial representation of an integrated circuit package in accordance with an embodiment of the present invention.

FIG. 9 is a side view of a pictorial representation of an integrated circuit package in accordance with an embodiment of the present invention.

Figure 10:
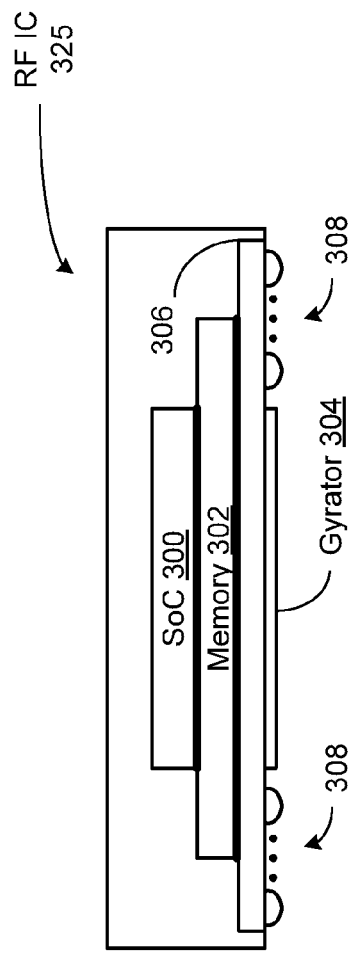

FIG. 10 is a side view of a pictorial representation of an integrated circuit package in accordance with an embodiment of the present invention.

Figure 11:
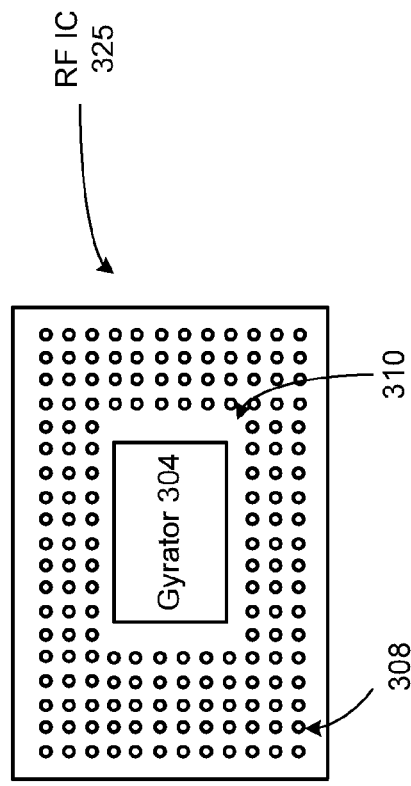

FIG. 11 is a bottom view of a pictorial representation of an integrated circuit package in accordance with an embodiment of the present invention.

Figure 12:
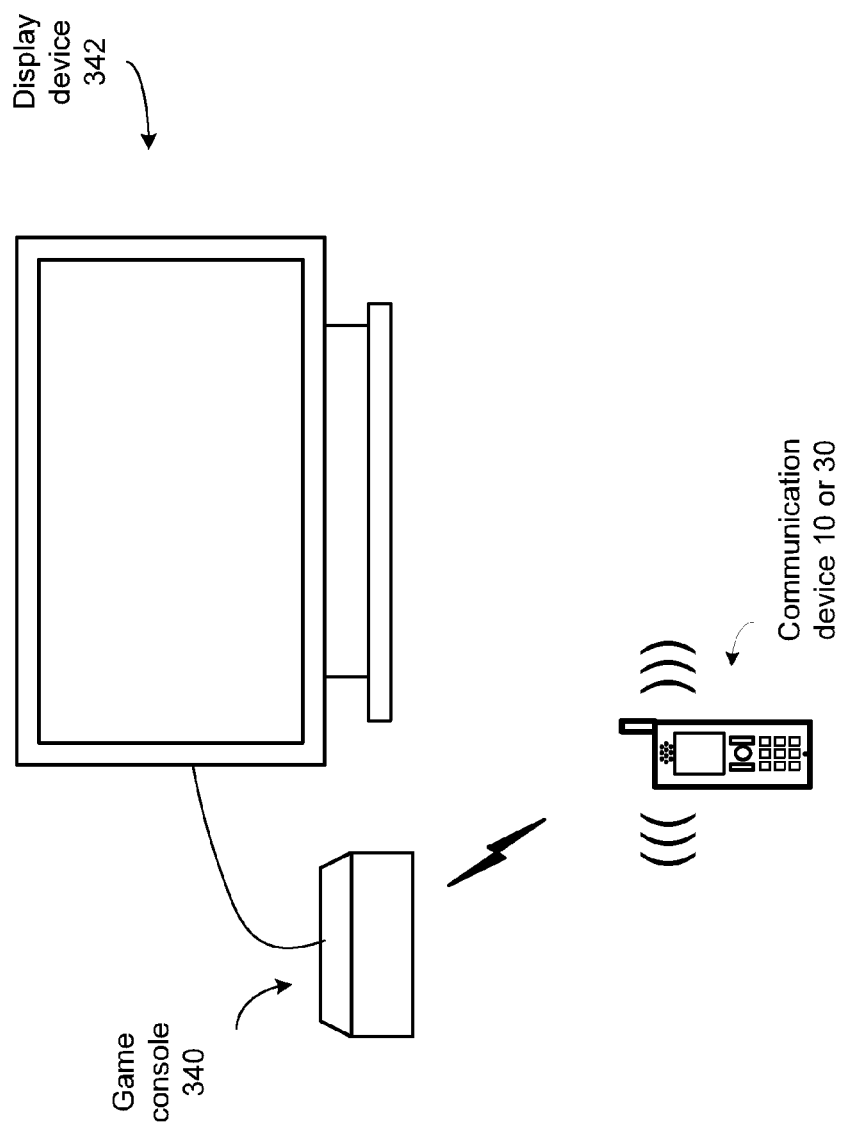

FIG. 12 is a pictorial representation of communication device 10 or 30 used in conjunction with a game console in accordance an embodiment of with the present invention.

Figure 13:
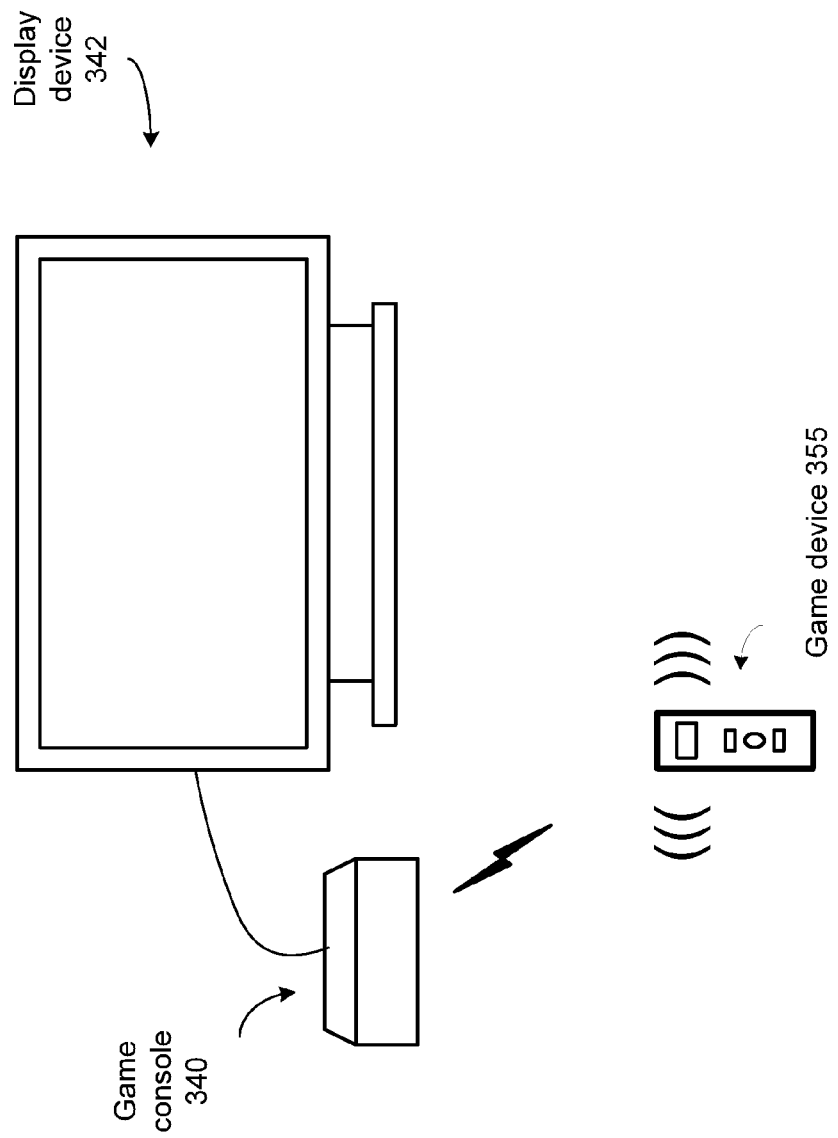

FIG. 13 is a pictorial representation of game device 355 used in conjunction with a game console in accordance with an embodiment of the present invention.

Figure 14:
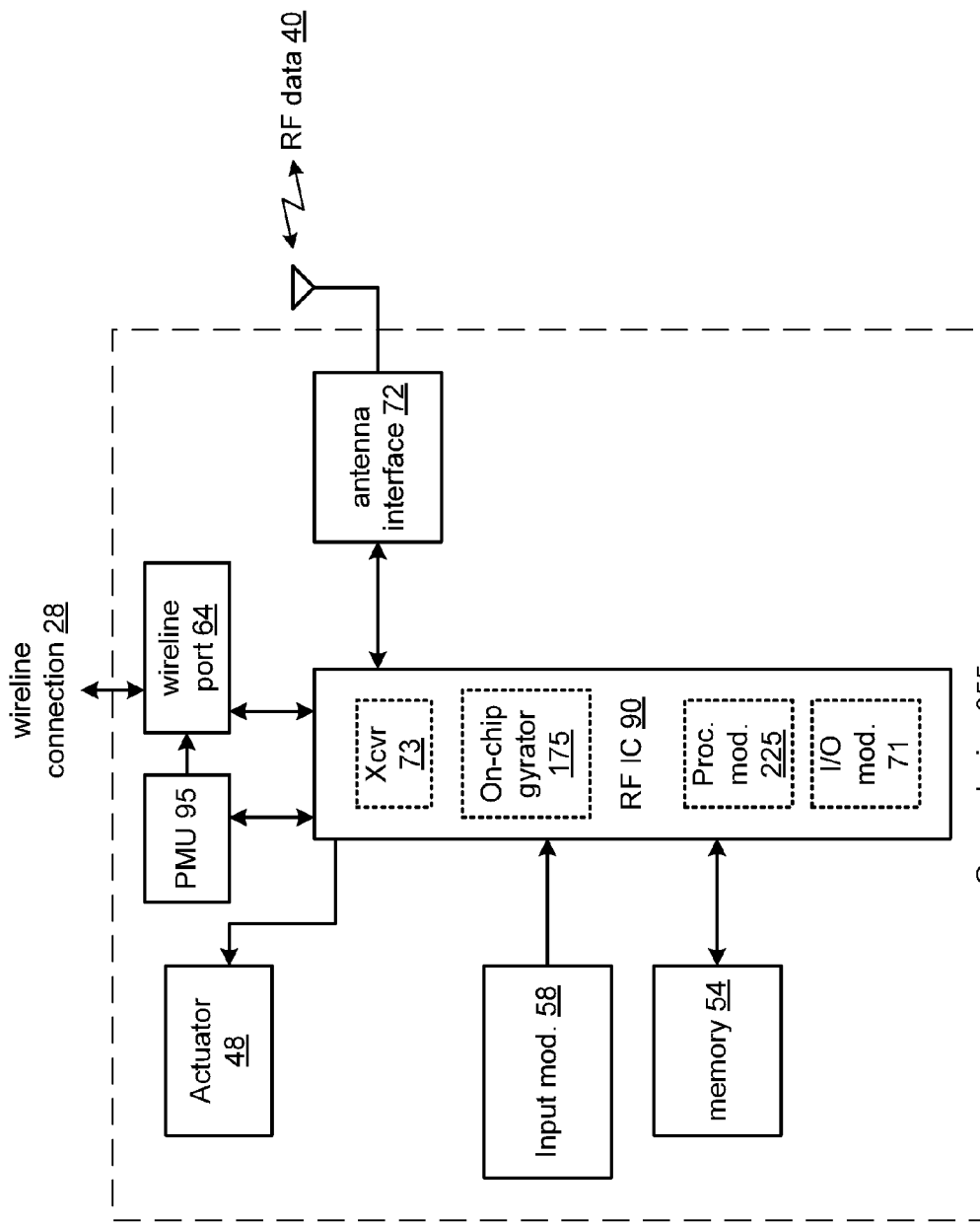
Figure 16:
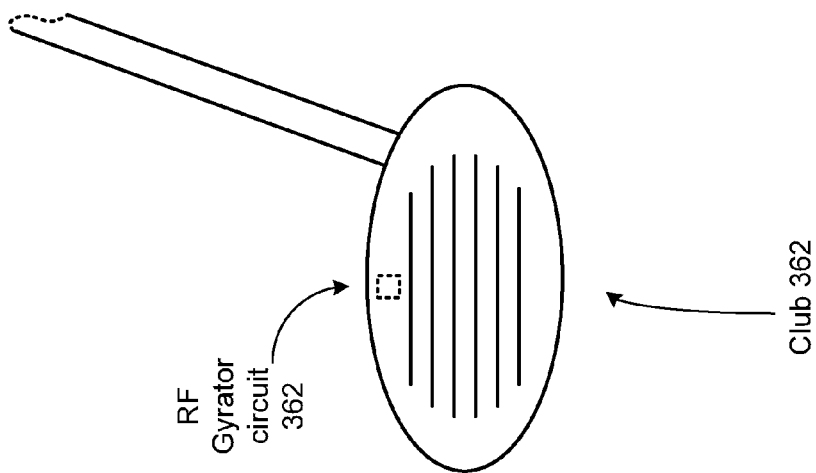
Figure 15:
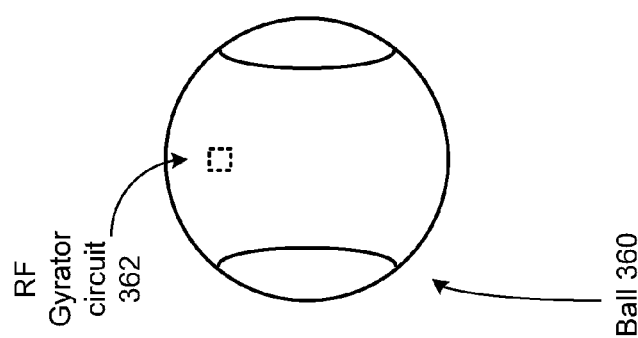

FIG. 14 is a schematic block diagram of another embodiment of an integrated circuit in accordance an embodiment with the present invention;

FIGS. 15 and 16 are pictorial representations of sporting goods in accordance with embodiments of the present invention.

Figure 17:
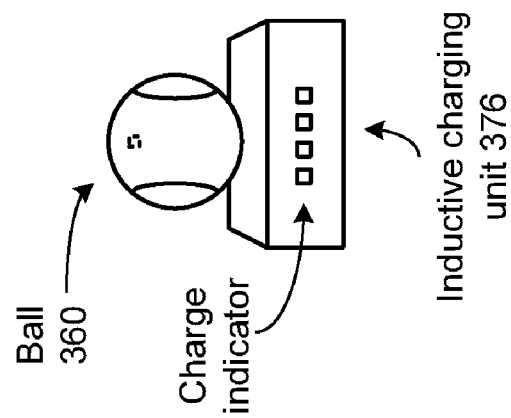

FIG. 17 is a pictorial representation of sporting good used in conjunction with an inductive charger in accordance with an embodiment of the present invention.

Figure 18:
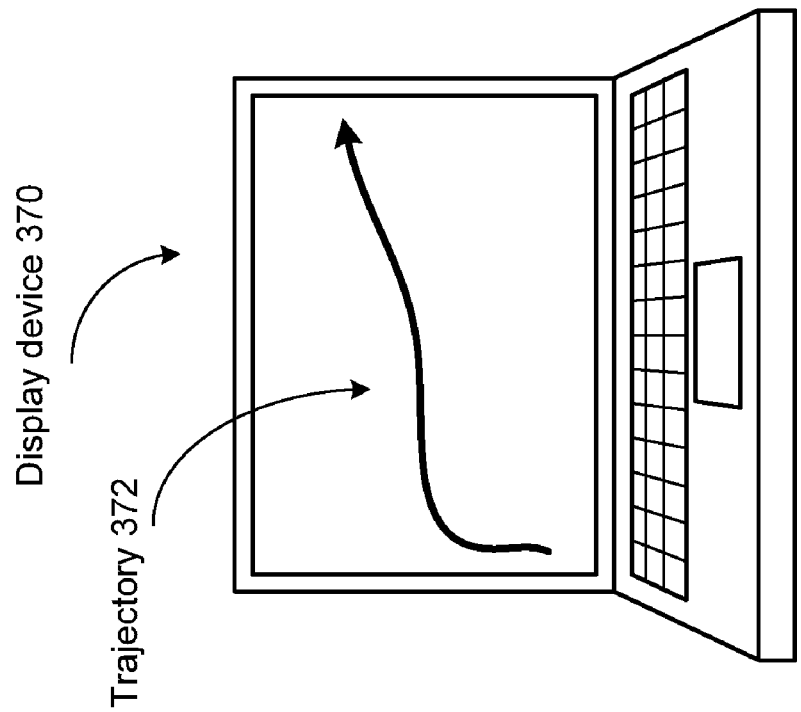

FIG. 18 is a pictorial representation of the display of a trajectory 372 generated using a sporting good in accordance with an embodiment of the present invention.

Figure 19:
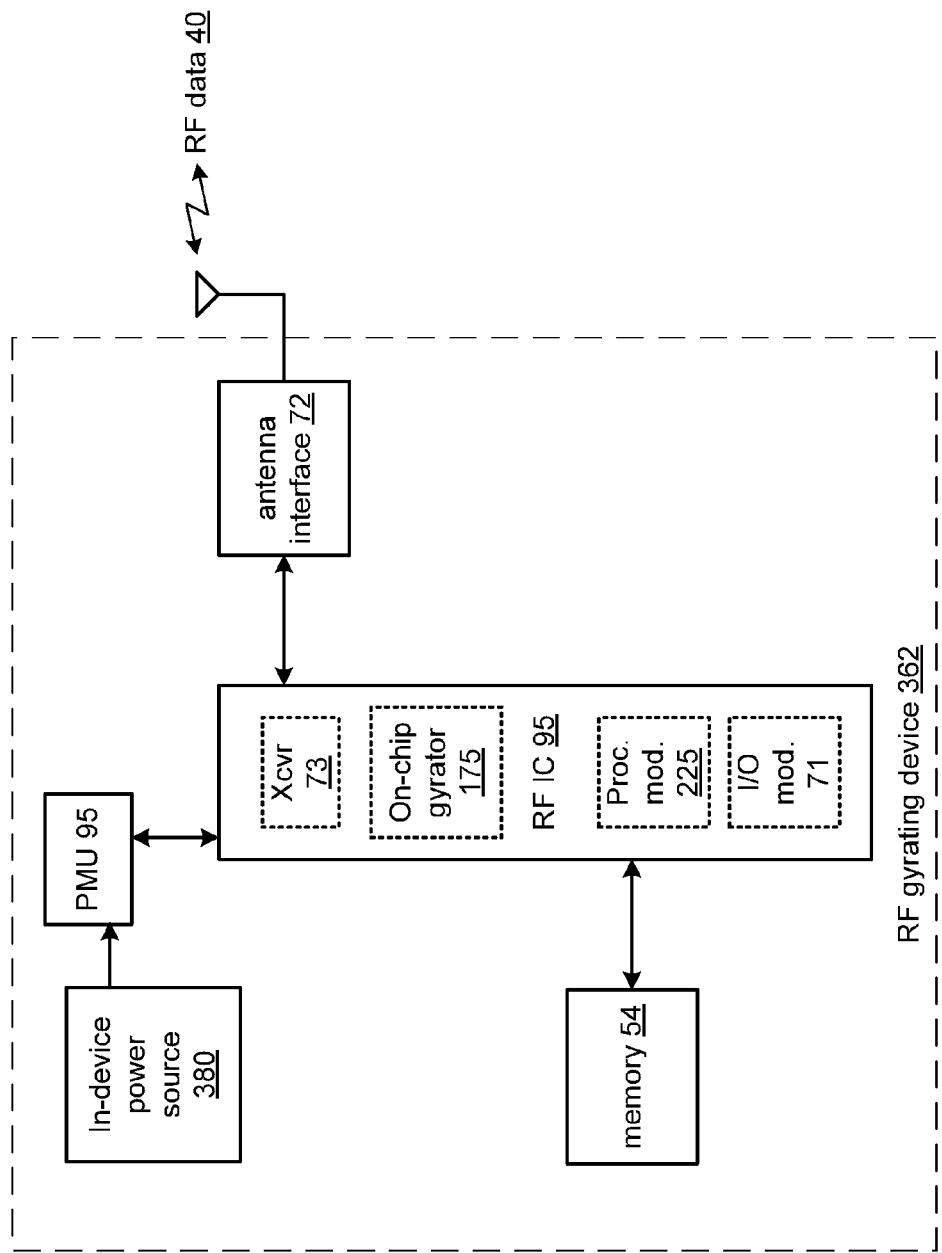
Figure 20:
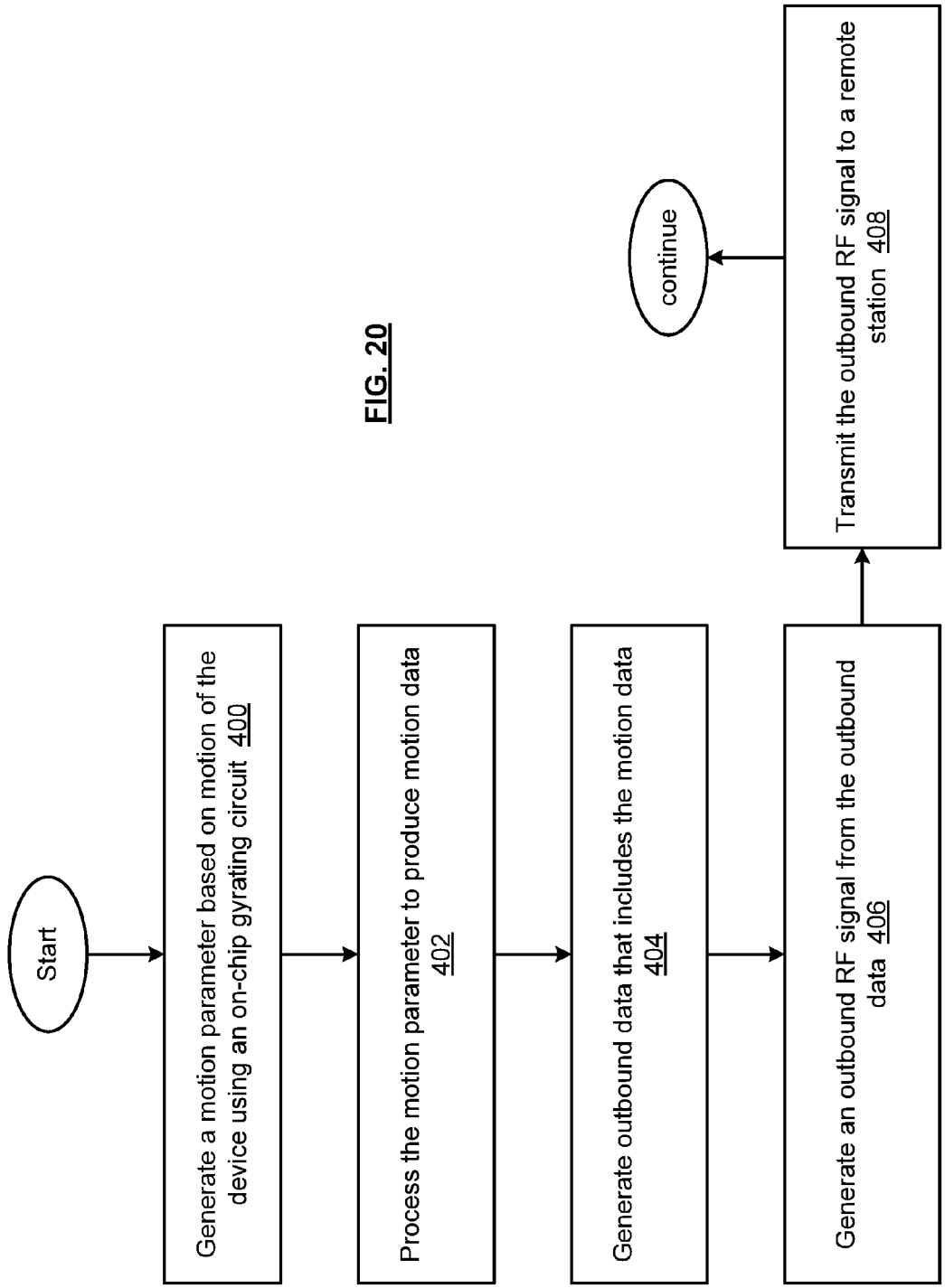

FIG. 19 is a schematic block diagram of another embodiment of an integrated circuit in accordance an embodiment with the present invention;

FIG. 20 is a flow chart of an embodiment of a method in accordance with the present invention.

Figure 21:
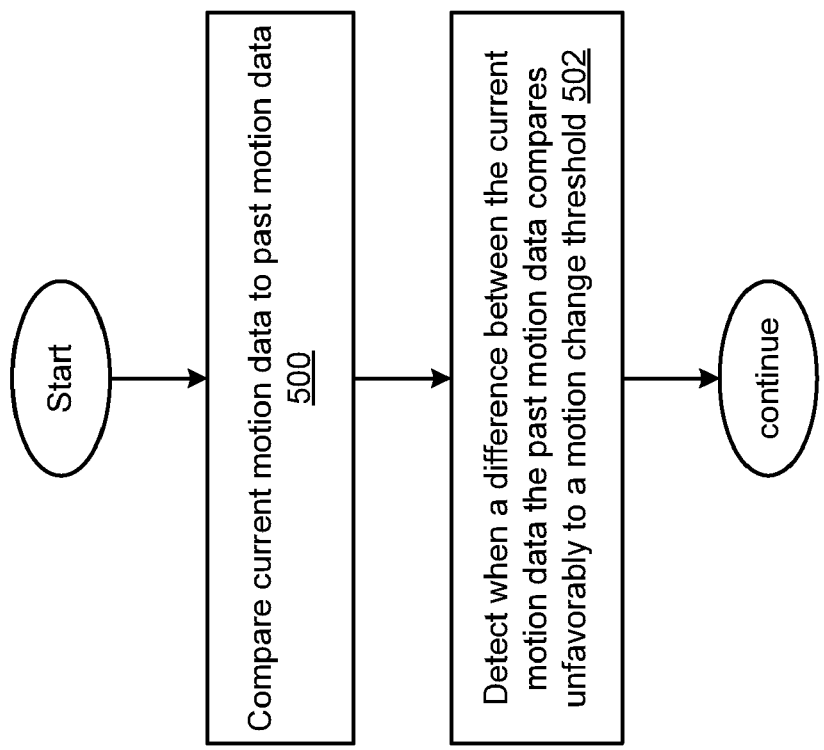

FIG. 21 is a flow chart of an embodiment of a method in accordance with the present invention.

Figure 22:
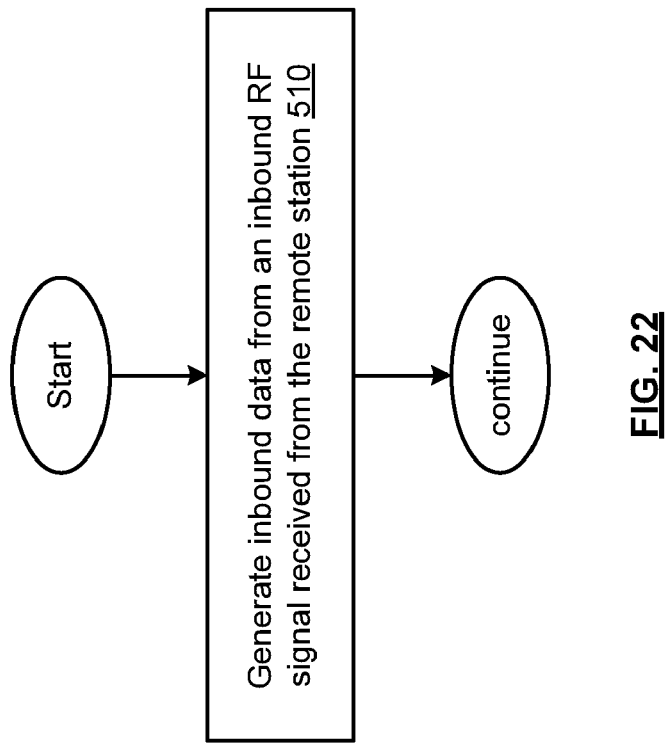

FIG. 22 is a flow chart of an embodiment of a method in accordance with the present invention.

FIG. 23 is a flow chart of an embodiment of a method in accordance with the present invention.

DETAILED DESCRIPTION OF THE INVENTION

Figure 1:
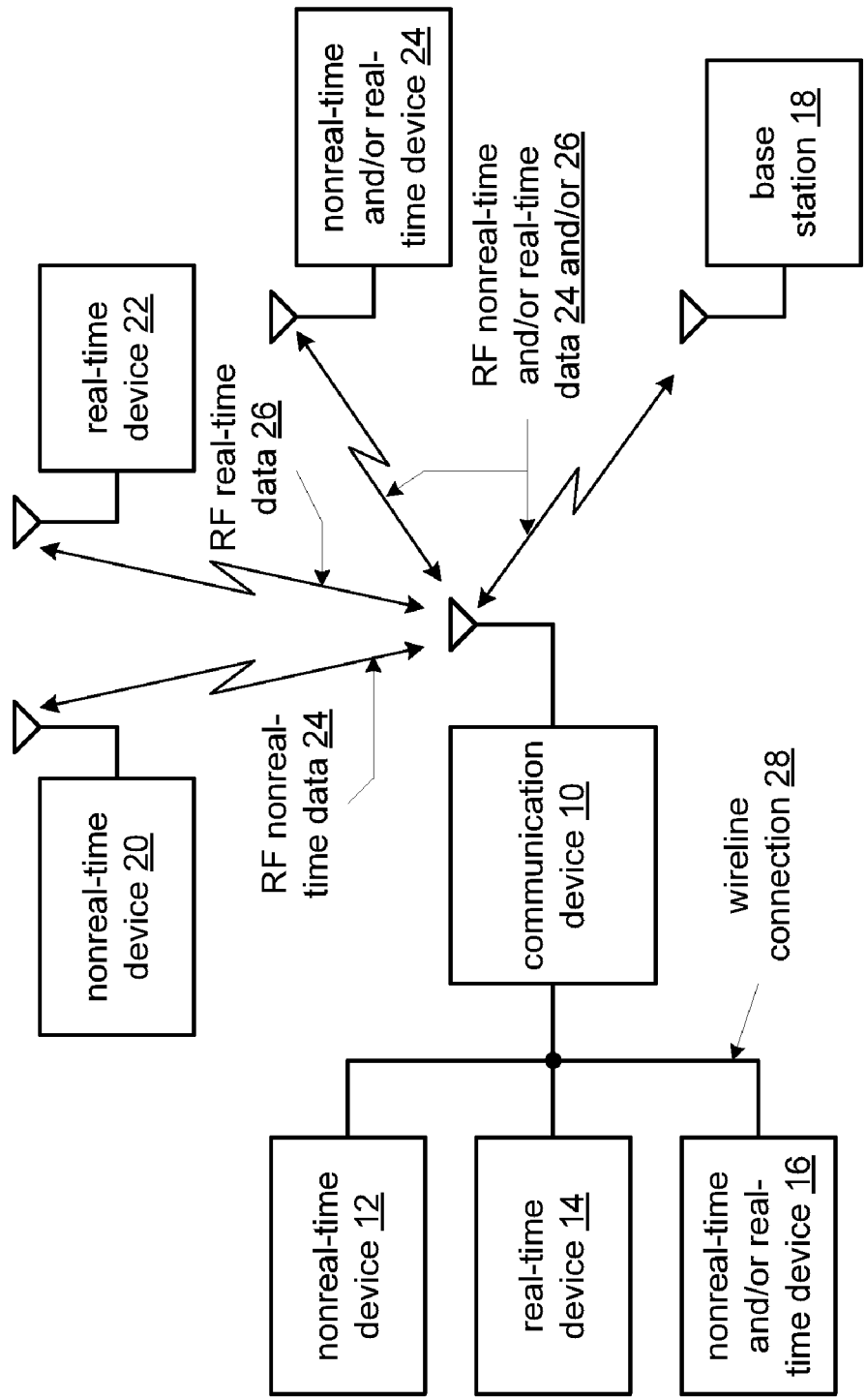
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, non-real-time device 20, real-time device 22, and non-real-time and/or real-time device 24. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, game device, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as an RF integrated circuit that includes one or more features or functions of the present invention. Such integrated circuits shall be described in greater detail in association with FIGS. 3-23 that follow.

Figure 2:
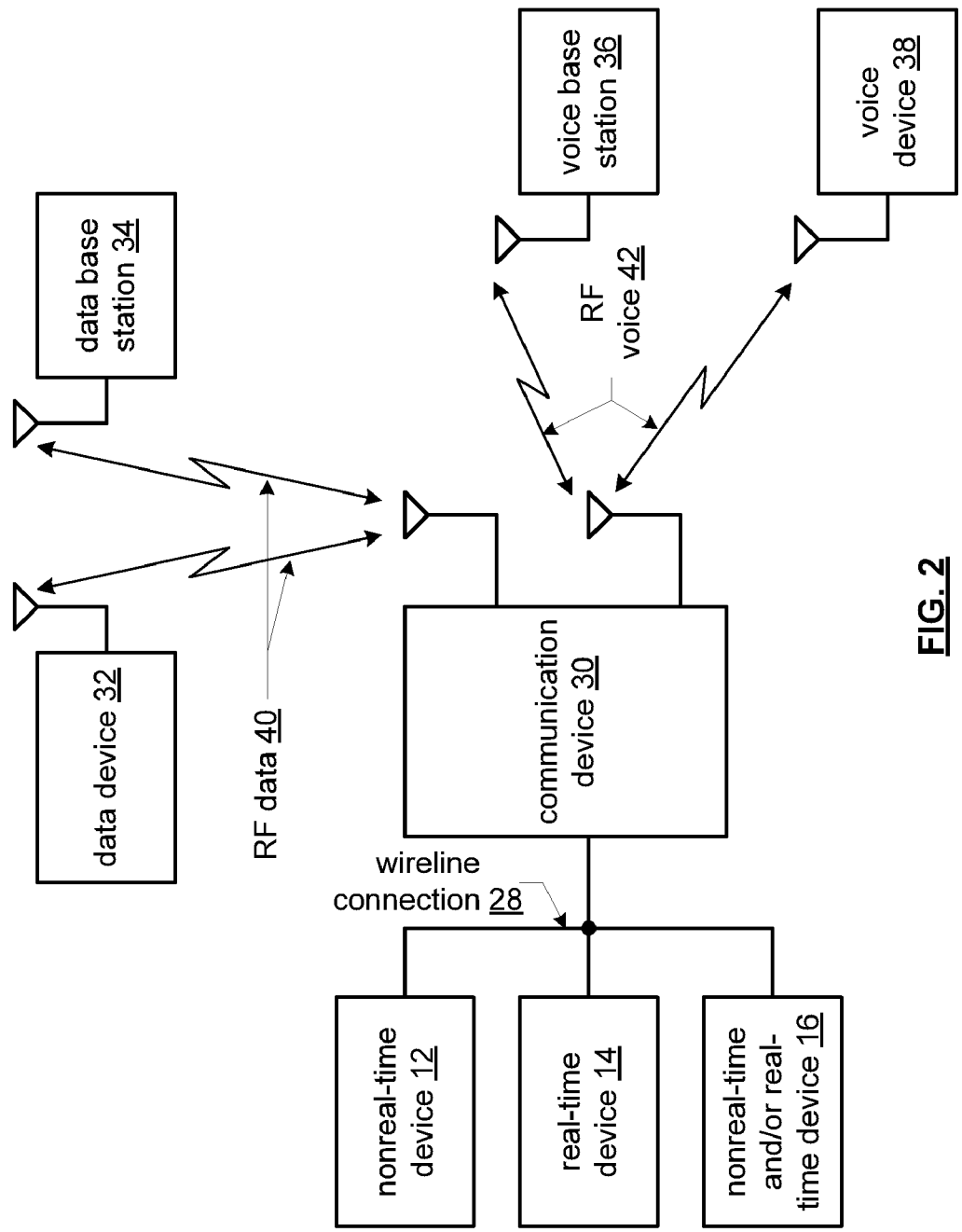
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

FIG. 3 presents a pictorial representation of a wireless network 111 in accordance with an embodiment of the present invention. The wireless network 111 includes an access point 110 that is coupled to packet switched backbone network 101. The access point 110 manages communication flow over the wireless network 111 destined for and originating from each of communication devices 121, 123, 125 and 127. Via the access point 110, each of the communication devices 121, 123, 125 and 127 can access service provider network 105 and Internet 103 to, for example, surf web-sites, download audio and/or video programming, send and receive messages such as text messages, voice message and multimedia messages, access broadcast, stored or streaming audio, video or other multimedia content, play games, send and receive telephone calls, and perform any other activities, provided directly by access point 110 or indirectly through packet switched backbone network 101.

One or more of the communication devices 121, 123, 125 and 127, such as communication device 125 is a mobile device that can include the functionality of communication devices 10 or 30. In particular, communication device 125 includes an RF integrated circuit (IC) having an on-chip gyrating circuit that generates a motion parameter based on motion of the device including a velocity, velocity vector, acceleration (including deceleration), indicating and/or other motion parameter. The RF IC processes the motion parameter to produce motion data, generates outbound data that includes the motion data and/or a flag or other data that indicates communication device 125 is a mobile device, generates an outbound RF signal from outbound data and transmits the outbound RF signal to a remote station, such as the access point 110.

In operation, access point 110 can change its own transmit and receive characteristics, based on the knowledge that communication device 125 is mobile, is in motion and/or based on information from a velocity vector or other motion data that indicates that the communication device 125 is moving into closer range, is moving out of range, is moving close to a known source of interference, is moving into an obstructed path, etc. Examples of transmit and receive characteristics include: transmit power levels; antenna configurations such as multi-input multi-output (MIMO) configuration, beam patterns, polarization patterns, diversity configurations, etc. to adapt the orientation and/or position of the communication device; protocol parameters and other transmit and receive characteristics of the access point.

In addition, access point 110 can generate control data to transmit to the communication device 127 or the communication devices 121, 123 and 125, to modify the transmit and receive characteristics of these devices. Further, in an embodiment of the present invention, access point 110 can generate a request to receive periodic motion data from the communication device 127. Alternatively, communication device 127 can generate and transmit motion data on a regular and/or periodic basis or in response to changes in motion data that compare unfavorably (such as to exceed) a motion change threshold, such as to inform the access point 100 when the communication device 127 starts, stops, changes speed and/or direction, etc.

For example, when communication device 127 indicates to access point 110 that it is a mobile device, access point 110 can request that communication device 127 send periodic motion data. If the access point 110 determines that the communication device 127 is moving out of range, it can increase its power level, and steer its antenna beam in the direction of the mobile device 127 and command the mobile device 127 to modify one or more if its transmit and/or receive parameters, such as to command the communication device 127 to increase its power level, steer its antenna beam at the access point and/or to modify other protocol parameters to compensate for a possible lowering of signal to noise ratio, etc.

Also, communication device can respond to the motion data it generates to control its transmit and receive characteristics, without intervention from the access point. For example, if the communication device 127 determines it is moving out of range, it can increase its power level, and steer its antenna beam in the direction of the access point 110 and/or modify other protocol parameters to compensate for a possible lowering of signal to noise ratio, etc.

FIG. 4 is a schematic block diagram of an embodiment of an integrated circuit in accordance with the present invention. In particular, an RF integrated circuit (IC) 50 is shown that implements communication device 10 in conjunction with microphone 60, keypad/keyboard 58, memory 54, speaker 62, display 56, camera 76, antenna interface 52 and wireline port 64. In operation, RF IC 50 includes a transceiver 73 having RF and baseband modules for formatting and modulating data into RF real-time data 26 and non-real-time data 24 and transmitting this data via an antenna interface 52 and antenna such as fixed antenna a single-input single-output (SISO) antenna, a multi-input multi-output (MIMO) antenna, a diversity antenna system, an antenna array or other antenna configuration that allows the beam shape, gain, polarization or other antenna parameters to be controlled. In addition, RF IC 50 includes input/output module 71 that includes the appropriate interfaces, drivers, encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Power management circuit (PMU) 95 includes one or more DC-DC converters, voltage regulators, current regulators or other power supplies for supplying the RF IC 50 and optionally the other components of communication device 10 and/or its peripheral devices with supply voltages and or currents (collectively power supply signals) that may be required to power these devices. Power management circuit 95 can operate from one or more batteries, line power, an inductive power received from a remote device, a piezoelectric source that generates power in response to motion of the integrated circuit and/or from other power sources, not shown. In particular, power management module can selectively supply power supply signals of different voltages, currents or current limits or with adjustable voltages, currents or current limits in response to power mode signals received from the RF IC 50. While shown as an off-chip module, PMU 95 can alternatively implemented as an on-chip circuit.

In addition, RF IC 50 includes an on-chip gyrating circuit such as on-chip gyrator 175 that generates a motion parameter based on motion of the RF IC 50. In an embodiment of the present invention, the on-chip gyrator is implemented with microelectromechanical systems (MEMS) technology to form a piezoelectric gyroscope, a vibrating wheel gyroscope, a tuning fork gyroscope, a hemispherical resonator gyroscope, or a rotating wheel gyroscope along one, two or three axes to indicate motion in one, two or three dimensions. In particular, the on-chip gyrating circuit includes a gyroscope element that is formed via dry etching, wet etching, electro discharge machining and/or via other MEMS or non-MEMS technology.

In operation, the RF transceiver 73 generates an outbound RF signal from outbound data and generates inbound data from an inbound RF signal. Further, processing module 225 is coupled to the on-chip gyrating circuit and the RF transceiver, and processes the motion parameter to produce motion data, generates the outbound data that includes the motion data, and receives the inbound data that optionally includes data from an access point to modify transmit and/or receive parameters in response to the motion data that was transmitted.

As discussed in conjunction with FIG. 3, the communication device, through command by the processing module 225 can respond to the motion data it generates from on-chip gyrator 175 to control the transmit and receive characteristics of transceiver 73, without intervention from the access point. For example, if the communication device 10 determines it is moving out of range, it can increase its power level, and steer its antenna beam in the direction of the access point and/or modify other protocol parameters to compensate for a possible lowering of signal to noise ratio, etc.

In an embodiment of the present invention, the RF IC 50 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the RF IC 50 executes operational instructions that implement one or more of the applications (realtime or non-real-time) attributed to communication devices 10, 30 and/or 127 as discussed above and in conjunction with FIGS. 1-3.

FIG. 5 is a schematic block diagram of another embodiment of an integrated circuit in accordance with the present invention. In particular, FIG. 5 presents a communication device 30 that includes many common elements of FIG. 4 that are referred to by common reference numerals. RF IC 70 is similar to RF IC 50 and is capable of any of the applications, functions and features attributed to RF IC 50 as discussed in conjunction with FIG. 3. However, RF IC 70 includes two separate wireless transceivers for communicating, contemporaneously, via two or more wireless communication protocols via RF data 40 and RF voice signals 42.

In operation, the RF IC 70 executes operational instructions that implement one or more of the applications (realtime or non-real-time) attributed to communication devices 10, 30 and 127 as discussed above and in conjunction with FIG. 1-3.

FIG. 6 is a schematic block diagram of an embodiment of RF transceiver 125, such as transceiver 73, in accordance with the present invention. The RF transceiver 125 includes an RF transmitter 129, and an RF receiver 127. The RF receiver 127 includes a RF front end 140, a down conversion module 142 and a receiver processing module 144. The RF transmitter 129 includes a transmitter processing module 146, an up conversion module 148, and a radio transmitter front-end 150.

As shown, the receiver and transmitter are each coupled to an antenna through an off-chip antenna interface 171 and a diplexer (duplexer) 177, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration. Also, the antenna structure of the wireless transceiver may depend on the particular standard(s) to which the wireless transceiver is compliant and the applications thereof.

In operation, the transmitter receives outbound realtime data 162 and outbound non-realtime data 163 from a host device, such as communication device 10 or other source via the transmitter processing module 146. The transmitter processing module 146 processes the outbound realtime data 162 and outbound non-realtime data 163 in accordance with a particular wireless communication standard (e.g., IEEE 802.11, Bluetooth, RFID, GSM, CDMA, et cetera) to produce baseband or low intermediate frequency (IF) transmit (TX) signals 164 that contain outbound realtime data 162 and/or outbound non-realtime data 163. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation 168.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152 and optionally controls the configuration of the antenna in response to one or more control signals 141 generated by processing module 225.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound realtime data 160 and inbound non-realtime data 161. The processing performed by the receiver processing module 144 includes, but is not limited to, digital intermediate frequency to baseband conversion, demodulation, demapping, depuncturing, decoding, and/or descrambling.

Further, processing module 225 generates one or more control signals 141 based either motion data generated from an on-chip gyrating circuit such as on-chip gyrator 175 or from an off-chip gyrator or other gyrator, or based on control data received in inbound data 160 from a remote station such as access point 110. In operation, processing module 225 generates control signals 141 to modify the transmit and/or receiver parameters of the RF transceiver 125 such as protocol parameters used by receiver processing module 144 and transmitter processing module 146, antenna configurations used by antenna interface 171 to set the beam pattern, gain, polarization or other antenna configuration of the antenna, transmit power levels used by radio transmitter front-end 150 and receiver parameters used by RF front-end 140.

In addition, as previously described, processing module 225 generates motion data from one or more motion parameters 161 and optionally includes this motion data in outbound data 162 that is transmitted to a remote station such as access point 110.

FIG. 7 is a side view of a pictorial representation of an integrated circuit package in accordance with an embodiment of the present invention. RF IC 330, such as RF IC 50 or 70, includes a gyrator die 314 with a gyrating circuit such as on-chip gyrator 175 gyrator and an RF system on a chip (SoC) die 312 that includes the remaining elements of RF IC 50 or 70, a substrate 306, and bonding pads 318. This figure is not drawn to scale, rather it is meant to be a pictorial representation that illustrates the juxtaposition of the RF SoC die 312, gyrator die 314 and the substrate 306. RF SoC die 312 and gyrator die are coupled to one another and to respective ones of the bonding pads 318 using bonding wires, bonding pads and/or by other connections.

FIG. 8 is a side view of a pictorial representation of an integrated circuit package in accordance with an embodiment of the present invention. RF IC 332 is similar to the configuration described in conjunction with FIG. 7 is presented with similar elements referred to by common reference numerals. In particular, alternate stacked configuration is shown that stacks gyrator die 314 on top of RF SoC die 312. In this configuration, RF SoC die 312 and gyrator die can be coupled to one another using bonding wires, bonding pads, conductive vias and/or by other connections. This figure is also not drawn to scale.

FIG. 9 is a side view of a pictorial representation of an integrated circuit package in accordance with an embodiment of the present invention. RF IC 334 is similar to the configuration described in conjunction with FIGS. 7 and 8 is presented with similar elements referred to by common reference numerals. In this particular configuration, on-chip gyrator 175 is included on RF SoC die 316 that includes the remaining components or RF IC 50 or 70. This figure is not drawn to scale FIG. 10 is a side view of a pictorial representation of an integrated circuit package in accordance with the present invention. RF IC 325, such as RF IC 50 or 70, includes a system on a chip (SoC) die 300, a memory die 302 a substrate 306, bonding pads 308 and gyrator 304, such as on-chip gyrating circuit 175. This figure is not drawn to scale. In particular, the RF IC 325 is integrated in a package with a top and a bottom having a plurality of bonding pads 308 to connect the voice data and RF IC 325 to a circuit board, and wherein the on-chip gyrator 304 is integrated along the bottom of the package. In an embodiment of the present invention, die 302 includes an on-chip memory and die 300 includes the processing module 225 and the remaining elements of RF IC 50 or 70. These dies are stacked and die bonding is employed to connect these two circuits and minimize the number of bonding pads, (balls) out to the package. Both SoC die 300 and memory die 302 are coupled to respective ones of the bonding pads 308 via bonding wires or other connections.

Gyrator 304 is coupled to the SoC die 300, and/or the memory die 302 via conductive vias, bonding wires, bonding pads or by other connections. The positioning of the Gyrator on the bottom of the package in a flip chip configuration allows good heat dissipation of the gyrator 304 to a circuit board when the RF integrated circuit is installed.

FIG. 11 is a bottom view of a pictorial representation of an integrated circuit package in accordance with the present invention. As shown, the bonding pads (balls) 308 are arrayed in an area of the bottom of the integrated circuit with an open center portion 310 and wherein the on-chip gyrator 304 is integrated in the open center portion. While a particular pattern and number of bonding pads 308 are shown, a greater or lesser number of bonding pads can likewise be employed with alternative configurations within the broad scope of the present invention.

While RF ICs 325, 330, 332 and 334 provide several possible implementations of RF ICs in accordance with the present invention, other circuits including other integrated circuit packages can be implemented including other stacked, in-line and flip chip configurations.

FIG. 12 is a pictorial representation of communication device 10 or 30 used in conjunction with a game console in accordance an embodiment of with the present invention. In particular, a multi-function communication device 10 or 30 also serves to provide a game device for a game console such as game console 340. In operation, the user interface of the communication device 10 or 30 includes a touch screen, or one or more buttons or other interface devices provide an input module that receive user inputs in conjunction with the operation of the game. As previously discussed, communication device 10 or 30 includes RF IC 50 or 70. The gyrating circuit is used to measure at least one motion parameter of the communication device. The RF transmitter wirelessly transmits the at least one motion parameter to a remote device such as game console 340. In addition, the processing module can process the user inputs to produce input data that is also transmitted to the game console and can optionally integrate one or more motion parameters with the input data to generate a game response that is wirelessly transmitted to the game console.

For instance, a button on the communication device can be used to set up a game such as a golf video game that is displayed on display device 342. After a button on the communication device 10 or 30 is pressed by the user to initiate a swing, a swinging motion of the communication device 10 or 30 generates motion data that is used by the game console to generate swing data and a golf swing in the game. Similarly, the communication device 10 or 30 can be used in place of a joy stick, game weapon, or other user interface for the game with motion of the communication device 10 or 30 correlating to the motion of a character or object in the game.

In an embodiment of the present invention, the communication device 10 or 30 further includes an actuator that generates a force or force feedback on the communication device 10 or 30 in response to an actuator signal included in inbound data received from the game console 340. This actuator can include a vibrator, motor, or other actuator that exerts a force to the user of communication device 10 or 30 such as a tactile force or other force. In addition, RF IC 50 or 70 is operable to extract the actuator signal from the inbound data and further includes an interface in input/output module 71 to provide the actuator signal to the actuator to produce the desired force. For instance, an explosion in the game can be used to trigger a vibration of the communication device 10 or 30. In addition, the actuator signal can be coordinated with motion of the video game device to simulate a game response to the motion. For instance, the point of the golf swing where the ball would be impacted can be simulated by a force, such as a vibration or other force exerted on the user by the communication device. In an auto racing game, if the user's car impacts a wall of the track in response to the motion of the communication device, the crash can be accompanied by a vibration or other force, etc. exerted on communication device 10 or 30 to enhance the user's gaming experience.

FIG. 13 is a pictorial representation of game device 355 used in conjunction with a game console in accordance with an embodiment of the present invention. This embodiment operates in a similar fashion to the various embodiments described in conjunction with FIG. 12, however, a dedicated device such as game device 355 is used. In this embodiment many of the functions and features described in conjunction with RF IC 50 or 70 are not necessary and game device 355 may be implemented with an RF IC having less than all of the functions, features and interfaces described in conjunction with RF IC 50 or 70.

FIG. 14 is a schematic block diagram of another embodiment of an integrated circuit in accordance an embodiment with the present invention. In particular game device 355 is shown that includes a reduced functionality RF IC 90 having similar elements of RF IC 50 or 70 that are referred to by common reference numerals and that can be implemented in an IC package in a similar fashion. In addition, RF IC 90 includes interfaces to actuator 48 that includes a vibrator, motor, or other actuator that exerts a force to the user of game device 355 such as a tactile force or other force. Input module 58 includes the buttons, joystick, touch screen, wheel or other user input devices implemented as part of the game device 355 to provide user inputs to the game.

FIGS. 15 and 16 are pictorial representations of sporting goods in accordance with embodiments of the present invention. In particular, sporting goods such as a ball 360 and club 362 are shown that include an RF gyrator circuit 362 that can be used to generated motion data such as a position, velocity, acceleration or trajectory of the sporting good, either as part of a game or for diagnostic purposes to improve a user's playing of a game. Ball 360 and club 362 are shown merely to illustrate two of the many possible sporting goods including bats, paddles, racquets and other striking objects, swinging elements, balls and other game objects that can incorporate the RF gyrator circuit 362 in accordance with the broader scope of the present invention and transmit motion data when struck, rolled, thrown or otherwise put in motion.

RF gyrator circuit operates similarly to circuits described in conjunction with RF ICs 50 and 70 to process and transmit motion data to a remote device such as a computer, scoring device or other device used in conjunction with a game or for diagnostics of a user's performance in a particular act of motion associated with a game. For instance, the trajectory of ball 360 such as a tennis ball can be used to determine the velocity of various shots including serves and returns, the position of the ball on the court, the trajectory of shots and optionally the position relative to the court so that balls can be ruled in or out. Motion data corresponding to a golf shot, golf swing, basketball shot, baseball swing, home run, kick off, or other sports can be transmitted for analysis remotely.

FIG. 17 is a pictorial representation of sporting good used in conjunction with an inductive charger in accordance with an embodiment of the present invention. In particular, RF gyrator IC 362 includes a inductive power unit for receiving a charge from inductive charging unit 376 to power the RF gyrator IC during operation. In this fashion, a sporting good, such as ball 360 or other sporting good, can be charged prior to its use until a charge indicator operating with feedback from RF gyrator IC 362 indicates that the inductive power unit of RF gyrator IC 372 is fully charged. At this point the sporting good can be placed in use to wirelessly transmit motion data.

FIG. 18 is a pictorial representation of the display of a trajectory 372 generated using a sporting good in accordance with an embodiment of the present invention. In particular a display device 370 such as a laptop computer is shown that includes an application such as a software program that wirelessly receives motion data to form and display a trajectory 372. In this fashion, a golf swing, tennis swing, bowling shot, or other sports trajectory can be displayed and analyzed by the user and used to improve his or her game. In an embodiment of the present invention, trajectories can be saved and compared, user trajectories can be compared to ideal trajectories or to trajectories of others. Trajectory parameters such as swing velocity, distance, height or other parameters can be extracted and analyzed to compare the user to others or to improve the user's game.

FIG. 19 is a schematic block diagram of another embodiment of an integrated circuit in accordance an embodiment with the present invention. In particular RF gyrator IC 62 includes a RF IC 95 that includes common elements from RF IC 50 or 70 that are referred to by common reference numerals. In addition, RF gyrator IC includes an in-device power source such as the inductive power unit discussed in conjunction with FIGS. 15-17, a piezoelectric power unit that operates based on motion of the sporting good, or operated using a long-life battery, battery or other source of power that can power the device for its intended operation. In this application PMU 95 can operate to conserve power for longer time between charging, or to otherwise extent the power life of the device.

While a particular circuit is shown with certain elements being included as part of RF IC 95 and other discrete components being coupled thereto, other boundaries between integrated and discrete components can likewise be employed in the present invention, with preferably most or all of the components of RF gyrator circuit 362 being included on a single integrated circuit.

FIG. 20 is a flow chart of an embodiment of a method in accordance with the present invention. In particular, a method is presented for use in conjunction with one or more of the functions and features described in conjunction with FIGS. 1-19. In step 400, a motion parameter is generated based on motion of the device using an on-chip gyrating circuit. In step 402, the motion parameter is processed to produce motion data. In step 404, outbound data is generated that includes the motion data. In step 406, an outbound RF signal is generated from outbound data. In step 408, the outbound RF signal is transmitted to a remote station.

In an embodiment of the present invention, the motion data includes an indication that a device is a mobile device, a velocity, a velocity vector and/or an acceleration. Step 404 can insert motion data in the outbound data periodically.

FIG. 21 is a flow chart of an embodiment of a method in accordance with the present invention. In particular a method is presented for use in conjunction with the method of FIG. 20. In addition, step 500 is included for comparing current motion data to past motion data. In step 502, the method detects when the difference between the current motion data and past the motion data compares unfavorably to a motion change threshold. If so, step 404 includes motion data in the outbound data.

FIG. 22 is a flow chart of an embodiment of a method in accordance with the present invention; and In particular a method is presented for use in conjunction with the method of FIG. 20. In addition, step 510 is included for generating inbound data from an inbound RF signal received from the remote station. Further, step 404 includes motion data in the outbound data in response to a request for the motion data included in the inbound data.

FIG. 23 is a flow chart of an embodiment of a method in accordance with the present invention. In particular a method is presented for use in conjunction with the method of FIG. 20-22. In addition, step 520 is included for generating inbound data from an inbound RF signal received from remote station, wherein the inbound data includes control data that is determined by the access point based on the motion data. In addition, the method includes step 522 for modifying a transmit parameter and/or receive parameter of an RF transceiver in response to the control data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A communication device comprising:
    an on-chip gyrating circuit that generates a motion parameter based on motion of the communication device;
    an RF transceiver that generates an outbound RF signal from an outbound symbol stream, that transmits the outbound RF signal to a remote station of a wireless network, and that generates an inbound symbol stream from an inbound RF signal received from the remote station; and
    a processing module coupled to process the motion parameter to produce motion data, to convert outbound data into the outbound symbol stream, to convert the inbound symbol stream into inbound data, to compare current motion data to past motion data, to detect when a difference between the current motion data and the past motion data compares unfavorably to a motion change threshold, and to include the motion data in the outbound data when the difference between the current motion data and the past motion data compares unfavorably to the motion change threshold.

2. The communication device of claim 1 wherein the motion data includes one of, a velocity and an acceleration.

3. The communication device of claim 1 wherein the motion data includes a velocity vector.

4. The communication device of claim 1 wherein the processing module includes motion data in the outbound data periodically.

5. The communication device of claim 1 wherein the motion data further includes an indication that the communication device is a mobile device.

6. The communication device of claim 1 wherein the on-chip gyrating circuit is implemented with microelectromechanical systems (MEMS) technology.

7. The communication device of claim 1 wherein the on-chip gyrating circuit includes one of:
    a piezoelectric gyroscope;
    a vibrating wheel gyroscope;
    a tuning fork gyroscope;
    a hemispherical resonator gyroscope; and
    a rotating wheel gyroscope.

8. The communication device of claim 1 wherein the on-chip gyrating circuit is integrated in an integrated circuit that includes at least one of, the RF transceiver, the memory module and the processing module.

9. The communication device of claim 1 wherein remote station is a game console having at least one game and the communication device provides the motion data as a portion of a user interface for the at least one game.

10. The communication device of claim 1 wherein the remote station is an access point and the inbound data includes control data that is determined by the access point based on the motion data.

11. The communication device of claim 10 wherein the communication device modifies a transmit parameter of the RF transceiver in response to the control data.

12. The communication device of claim 10 wherein the communication device modifies a receive parameter of the RF transceiver in response to the control data.

13. A method for use in a device, the method comprising:
generating a motion parameter based on motion of the device using an on-chip gyrating circuit;
generating inbound data from an inbound RF signal received from the remote station;
processing the motion parameter to produce the motion data,
detecting when a difference between current motion data and past motion data compares unfavorably to a motion change threshold;
generating outbound data that includes the motion data when the difference between the current motion data and the past motion data compares unfavorably to the motion change threshold;
generating an outbound RF signal from outbound data; and
transmitting the outbound RF signal to the remote station.

14. The method of claim 13 wherein the motion data includes an indication that the device is a mobile device.

15. The method of claim 13 wherein the device is a communication device and the station is an access point, the method further comprising:
generating inbound data from an inbound RF signal received from remote station, wherein the inbound data includes control data that is determined by the access point based on the motion data, and wherein the method further comprises at least one of:
modifying a transmit parameter of an RF transceiver in response to the control data; and
modifying a receive parameter of the RF transceiver in response to the control data.

* * * * *